United States Patent [19]

McElveen

[11] 4,420,230

[45] * Dec. 13, 1983

[54] PRODUCTION OF THREE DIMENSIONAL MOTION PICTURES

[76] Inventor: Robert H. McElveen, 212 W. Jefferies St., Gaffney, S.C. 29340

[*] Notice: The portion of the term of this patent subsequent to Dec. 1, 1998 has been disclaimed.

[21] Appl. No.: 314,799

[22] Filed: Oct. 26, 1981

Related U.S. Application Data

[63] Continuation-in-part of Ser. No. 69,708, Aug. 27, 1979, Pat. No. 4,303,316.

[51] Int. Cl.³ .............................................. G03B 21/32
[52] U.S. Cl. ....................................... 352/43; 352/57; 352/86
[58] Field of Search ..................... 352/57, 60, 86, 59, 352/62, 65, 43, 53, 89

[56] References Cited

U.S. PATENT DOCUMENTS 1,265,352  5/1918  Merrill et al. .
1,394,797  10/1921  Smith .
2,011,353  8/1935  Capstaff .
3,482,908  12/1969  McCormick .

Primary Examiner—Monroe H. Hayes
Attorney, Agent, or Firm—Luke J. Wilburn, Jr.; Wellington M. Manning, Jr.

[57] ABSTRACT

A process for recording and projecting a three dimensional visual scene onto a receiving surface from which the scene may be viewed in stereopsis by the unaided human eye. A scene is recorded from right and left view positions which are laterally separated by a distance of no more than about 1 inch, and separated in a direction generally perpendicular thereto by a distance of no more than about 1 inch, groups of one or more recorded right and recorded left views are alternately projected onto a receiving surface in sequence such that the visual duration of each group varies from a minimum to a maximum time which is generally proportional to the distance of the nearest non-moving object of special regard in the scene from the recording positions and is approximately equal to the visiopsychological supression rate of the human eyes. In addition, the central points of focus of the left and right views may be selectively set at different distances during the recording to reduce keystoning effect of the projected views during visualization.

13 Claims, 3 Drawing Figures

PRODUCTION OF THREE DIMENSIONAL MOTION PICTURES

This application is a continuation-in-part of my earlier filed application, Ser. No. 06/069,708, filed Aug. 27, 1979, now U.S. Pat. No. 4,303,316.

This invention relates to the production of motion pictures which may be visualized in stereopsis, or three dimension, by the unaided human eye, and, more particularly, to an improved process for recording visual scenes which may be projected onto a receiving surface for visualization by the unaided human eye, i.e., without the need of special glasses or other equipment positioned between the eye of the observer and the receiving surface.

The present invention deals with further improvements in the process for recording visual scenes for reproduction in stereopsis as defined and described in my co-pending U.S. patent application Ser. No. 06/069708 filed Aug. 27, 1979, which issued as U.S. Pat. No. 4,303,316 on Dec. 1, 1981, which co-pending application is a continuation-in-part application of my prior U.S. patent application Ser. No. 952,780 filed Oct. 1978, which was itself a continuation-in-part of my previous U.S. patent application Ser. No. 751,141 filed Dec. 16, 1976, said applications Ser. Nos. 952,780 and 751,141 being abandoned. The disclosuresof all of my aforesaid pending U.S. patent applications are included herein by specific reference thereto.

DEFINITIONS

The term "visual scene" as used herein means and includes any visible object or image or group of objects or images, both moving and still, which can be observed in three dimension in the real world by the human eyes. Such term typically includes, without limitation, all animate and inanimate objects, alone or in combination, and moving or still, in which the human eyes may perceive a depth relationship.

The term "recording" as used herein means capturing information of a visual scene in any form which may be used to project the scene onto a receiving surface for visualization. Such term includes capturing the visual scene on photographic film, such as a motion picture film, as well as capturing the visual scene, either permanently or momentarily, in the form of electronic, magnetic, electromagnetic, sound, or other signal information which may be reproduced as visible images on a receiving surface, such as on a conventional motion picture theatre screen, or on the receiving screen of a conventional home television set.

The term "projecting" as used herein means the transmission, in any manner, of the recorded visual scene information, e.g., photographic film image, electronic, electromagnetic, sound and other signal information, onto a receiving surface for visual observation.

As used herein, "motion picture" means the recorded information of a visual scene, in whatever form, which may be sequentially projected onto a receiving surface for continuous visual observation.

BACKGROUND OF THE INVENTION

As described in detail in my aforesaid prior filed U.S. patent applications, many suggestions have been made in the prior art for producing three dimensional motion pictures. Many prior art methods and apparatus have suggested the use of multiple recording cameras separated by a lateral lens distance to obtain right and left recorded film frame views of the scene, with subsequent projection of left and right film frame views in alternating sequence onto a receiving surface for visualization. Many of such prior art attempts also required multiple projectors and auxiliary apparatus positioned between the eyes of the observer and the surface onto which the scenes were projected, e.g., differently colored or polarized glasses to be worn by the observer, or complicated moving shutter systems positioned between the projector or observer and the screen surface being observed.

Prior art patents relating to three dimensional photography which have been developed and made of record in prosecution of my aforesaid prior patent applications are identified as follows:

| | |
|---|---|
| U.S. Pat. No. 765,980 | U.S. Pat. No. 2,792,745 |
| U.S. Pat. No. 1,265,352 | U.S. Pat. No. 2,860,562 |
| U.S. Pat. No. 1,307,074 | U.S. Pat. No. 2,891,440 |
| U.S. Pat. No. 1,351,508 | U.S. Pat. No. 2,938,425 |
| U.S. Pat. No. 1,394,797 | U.S. Pat. No. 2,952,182 |
| U.S. Pat. No. 1,435,520 | U.S. Pat. No. 2,996,949 |
| U.S. Pat. No. 1,488,027 | U.S. Pat. No. 3,006,241 |
| U.S. Pat. No. 1,927,925 | U.S. Pat. No. 3,178,720 |
| U.S. Pat. No. 1,939,343 | U.S. Pat. No. 3,186,002 |
| U.S. Pat. No. 2,011,353 | U.S. Pat. No. 3,240,549 |
| U.S. Pat. No. 2,022,454 | U.S. Pat. No. 3,324,760 |
| U.S. Pat. No. 2,080,604 | U.S. Pat. No. 3,366,438 |
| U.S. Pat. No. 2,101,842 | U.S. Pat. No. 3,482,908 |
| U.S. Pat. No. 2,101,979 | U.S. Pat. No. 3,482,913 |
| U.S. Pat. No. 2,111,445 | U.S. Pat. No. 3,508,920 |
| U.S. Pat. No. 2,114,060 | U.S. Pat. No. 3,520,588 |
| U.S. Pat. No. 2,157,099 | U.S. Pat. No. 3,737,567 |
| U.S. Pat. No. 2,194,737 | U.S. Pat. No. 3,815,979 |
| U.S. Pat. No. 2,375,962 | U.S. Pat. No. 3,903,358 |
| U.S. Pat. No. 2,478,891 | U.S. Pat. No. 3,960,563 |
| U.S. Pat. No. 2,566,700 | U.S. Pat. No. 3,963,332 |
| U.S. Pat. No. 2,627,200 | U.S. Pat. No. 4,131,342 |
| U.S. Pat. No. 2,727,427 | Brit. 552,582 |
| U.S. Pat. No. 2,729,427 | Brit. 555,670 |
| U.S. Pat. No. 2,792,745 | |

To my knowledge, no prior art methods or apparatus for producing three-dimensional motion pictures have gained any significant commercial acceptance. This is believed to be due to the expense and inconvenience of using or wearing the auxiliary equipment for visualization, and by a major problem of objectionable flicker, jump, or "keystoning" effect occurring in a projected scene due to the difficulty in accurately superimposing right and left views of the scene on a viewing surface.

As described in my aforesaid previously filed U.S. patent applications, I discovered that naturally occurring visual scenes could be recorded and projected onto a conventional two dimensional receiving surface for acceptable visualization in stereopsis by the unaided human eye by maintaining certain critical parameters in the process of recording and projection of the visual scene. More specifically, I found that naturally occurring visual scenes must be recorded from left and right camera lens positions, separated at a lateral distance of no more than about one inch. The recorded scenes must be projected onto a surface for visualization at an alternating right/left view duration, or film frame tempo rate, which is approximately equal to the visio-psychological alternation rate between right and left eye views of the human visual apparatus. This alternation rate of right and left eye views in the human brain which permits the mind to visualize a scene in stereopsis has been found to be from between about 1/24 to ¼ of a second.

As also described in my aforesaid U.S. patent applications, I discovered that all moving objects in a scene to be recorded may be disregarded when establishing the control parameters of lateral lens base separation of the recording cameras and the film frame tempo (visual duration of left and right views), to provide acceptable visualization in stereopsis by the unaided human eye. More particularly, I discovered that the predominant point of consideration in establishing the aforementioned parameters is the nearest non-moving object in the visual scene to be recorded. By utilizing the nearest non-moving object in the natural scene as a reference point, precise variations within the aforementioned limits of lens base separation and film frame tempo can be established.

As also mentioned in my aforementioned patent applications, I found that stereopsis without objectionable flicker or keystoning effect could be further enhanced by maintaining a focus disparity between the right and left view recording cameras based on the distance to the nearest non-moving object in the scene. That is, by setting the central point of focus of the left and right recorded views of the scene at different selected distances relative to the nearest predominant non-moving object in the scene, flicker or jump between right and left views during projection is further diminished. Preferably, the central point of focus of one recording camera is set at a distance in front of the nearest non-moving object which is approximately one third of the distance of the object from the camera, while the central point of focus of the other camera is set at a distance behind, or beyond, the nearest non-moving object which is approximately one third more than the distance of the object from the recording camera.

SUMMARY OF THE INVENTION

In addition to a lateral, or horizontal, lens base separation and a film frame tempo between right and left views based on distance of the recording positions to the nearest non-moving object of special regard in the scene, I have now discovered an additional control parameter in the recording of visual scenes which may be employed to provide better visualization of recorded scenes in stereopsis by the unaided human eye. Specifically, I have discovered that the stereoptic effect can be further improved by maintaining the two scene-recording positions at an effective lens separation in two directions perpendicular to each other, for example, a lens base separation in a first lateral, or horizontal, direction within a distance of less than about 1 inch to give left and right views of the scene, as previously disclosed, and in a second direction generally perpendicular to said first direction, e.g. a vertical direction, within a distance of less than about 1 inch to give "over" and "under" views of the scene. These two recording lens separation parameters, when combined with the control parameter of film frame tempo when projecting the scene, further improves and essentially eliminates any flicker, jump or keystoning effect in the projected scene observed by the human eye.

BRIEF OBJECTS OF THE INVENTION

It is an object of the present invention to provide an improved process for recording and projecting motion pictures which may be viewed in stereopsis by the unaided human eye.

It is another object to provide a process for stereoptic reproduction and projection which may be viewed by the unaided human eye by the use of conventional projecting equipment and a single projector.

It is another object to provide an improved process of producing stereoptic motion pictures in which keystoning effect between left and right view images of the visual scene is minimized or eliminated.

BRIEF DESCRIPTION OF THE DRAWINGS

The above as well as other objects of the present invention will become more apparent, and the invention will be better understood from the following detailed description of preferred embodiments thereof, when taken together with the accompanying drawings, in which.

DETAILED DESCRIPTION OF PREFERRED EMBODIMENTS

Figure 1:
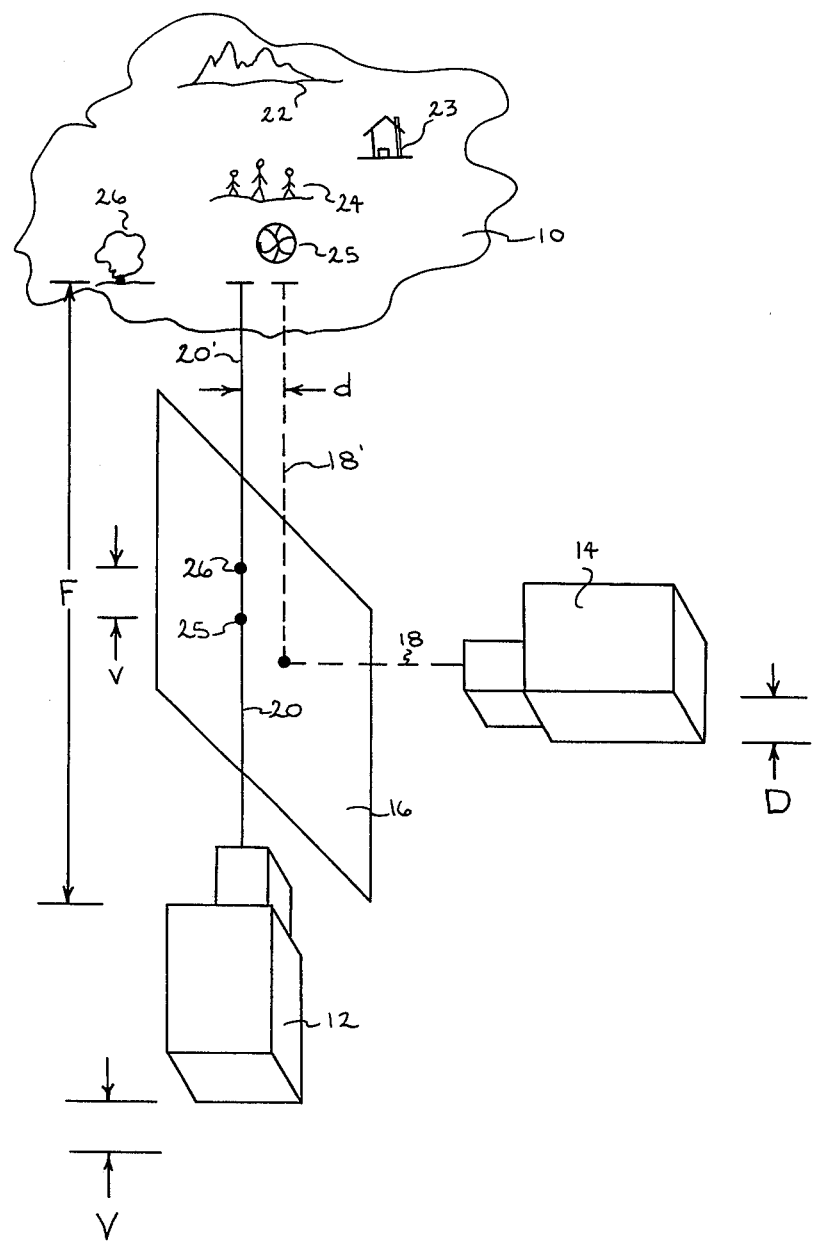
FIG. 1 is a schematic representation of a dual camera arrangement for recording a naturally occurring visual scene containing far, intermediate, and near objects, both moving and still, and animate and inanimate, illustrating a manner in which the recording steps of the process of the present invention may be achieved.

As illustrated in FIG. 1, the process of the present invention includes the step of recording a live visual scene 10 from two recording positions located at spaced lens base distances to provide left and right recorded views, as well as "over" and "under" recorded views of the scene. The scene may be simultaneously recorded by locating two cameras 12, 14 with their lenses disposed at right angles to each other and directed at a two-way mirror 16. The line of sight, or lens axis, of the right view recording camera 14 is illustrated by the broken lines 18, 18', and the lens axis of the left view recording camera is illustrated by the full lines 20, 20'. The two-way mirror 16 is constructed, in known manner, such that the visual scene 10 may be directly observed and recorded by camera 12 through the mirror, while it may be simultaneously reflected and recorded by camera 14, with the mirror 16 in a vertical plane and located at a 45° angle to the lens axis of each camera. The cameras and mirror are positioned so that the lens axes 18', 20' extend parallel from the two-way mirror to the scene 10 to be recorded.

Camera 14 is supported, in suitable manner, to be adjustably moved and positioned in a horizontal plane through a distance D to separate the lens axes 18', 20' of the two cameras in a horizontal plane by a corresponding distance d, which is at all times maintained less than about 1 inch. In like manner, left view recording camera 12 is supported, in suitable manner, to be adjustably moved and positioned in a vertical plane through a distance V to correspondingly move its lens axis 20, 20' vertically upwardly or downwardly through a distance v, such as from point 25 on mirror 16 which lies in a common horizontal plane with lens axis 18, 18', to a point 26 on the mirror above point 25. Distance v is always maintained at a vertical separation from the lens axis 18, 18' of camera 14 (either above or below the same) of less than about one inch. 20' indicates the lens axis of camera 12 to the scene 10 which is vertically displaced from the lens axis of camera 14 by a vertical distance v.

Various objects in the scene 10 are represented by mountains 22 in the far distance, a house 23 in the immediate far distance, children 24 playing with a ball 25 in the mid-distance of the scene, and the nearest non-moving object in the scene is represented by a tree 26.

Although camera 14 has been described as adjustably movable in a horizontal plane, with camera 12 being adjustably movable in a vertical plane, the adjustability of the cameras could be reversed, it only being necessary that the two recording cameras be adjustably positionable to provide lens positions equidistant from the scene and separated horizontally into right and left views, and vertically into over and under views of the scene. The separation of the camera lens, both vertically and horizontally, are at all times maintained at a distance of no more than about one inch.

Figure 2:
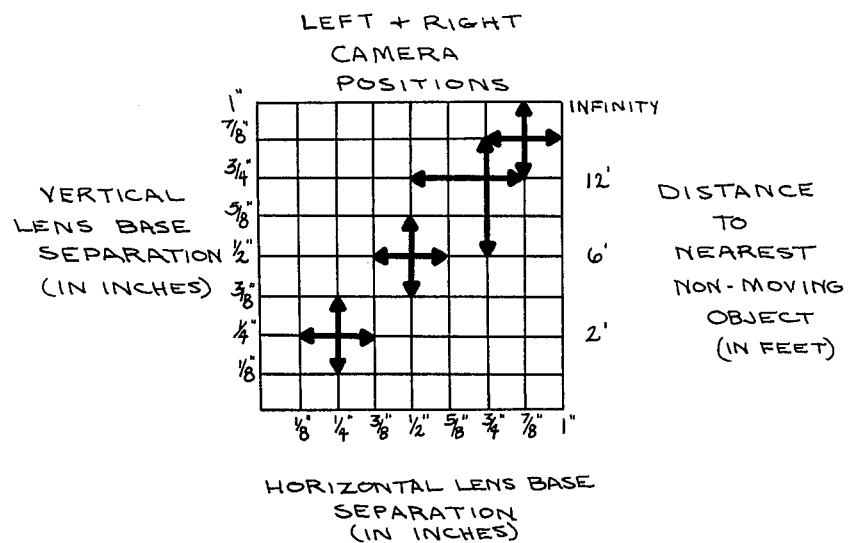
FIG. 2 is a graph representing preferred ranges within defined parameters of horizontal and vertical lens base separation which may be employed in the process of the present invention, such ranges being represented in relation to the distance of the nearest non-moving object in the scene from the recording cameras.

As illustrated in FIG. 1, the distance of the recording lenses of the two cameras 12, 14 to the nearest non-moving object 26 of special regard in scene 10 is represented by the distance F. FIG. 2 is a graph illustrating by double-headed arrows ranges of distance of horizontal and vertical lens base separation which may be employed for a particular distance to the nearest non-moving object in the scene, such object distances being indicated in feet from the recording camera positions. The lengths of the arrows in the graph of FIG. 2 illustrate an acceptable range of separation in the horizontal and vertical, depending upon the distance to the nearest non-moving in a scene, with the crossover points of each of the sets of arrows being considered optimum for the particular non-moving object distance.

Thus, in recording a visual scene, one determines the approximate distance to the nearest non-moving object in the scene, and the corresponding lens base separations, in both vertical and horizontal directions, can be easily established. For example, if the nearest non-moving object is a close-up shot at a distance of about 2 feet or less, the optimum vertical and horizontal lens base separation would be ¼ of a inch, but could be varied between ⅛ to ⅜ of an inch with good results in stereopsis.

In addition to horizontal and vertical lens base separation within the limits aforementioned, it is also desirable to employ a focus disparity between right and left recorded views of the scene. Based on the distance to the nearest non-moving object of special regard in the scene, it is preferable to maintain the central point of focus of one of the recording cameras at a distance in front of the nearest non-moving object which is approximately one third of the distance to the object, while the central point of focus of the other recording camera may be set at a distance behind, or beyond, the nearest non-moving object which is approximately one third more than the distance to the object. Such focus disparity provides improved stereopsis in that it further minimizes and eliminates keystoning, flicker or jump between right and left recorded views when they are projected for visualization.

By way of example, I have observed that for most camera lens systems, focus distances above thirty feet from the camera may be generally considered and handled as infinity focus for the lens system. Thus, in employing the focus disparity concept in the present invention, the following chart may indicate typical distance settings for left and right view recording lens systems.

| Distance to Nearest Non-Moving Object In Scene | 30' | 24' | 12' | 6' | 3' | 1' |
|---|---|---|---|---|---|---|
| Central focus Setting For Lens System of Recording Position #1 | Inf. | Inf. | 16' | 8' | 4' | 1¼' |
| Central Focus Setting For Lens System of Recording Position #2 | 20' | 18' | 8' | 4' | 1' | ⅔' |

As indicated, it is also necessary to the method of the present invention that the left and right recorded views of the visual scene, which comprise both horizontal and vertical lens base separation distances, be projected at a correct film frame tempo or rate for visualization in stereopsis.

Figure 3:
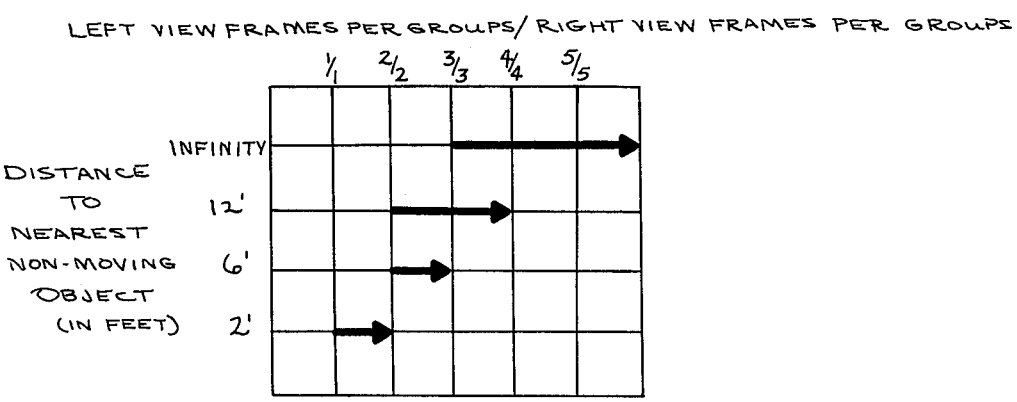
FIG. 3 is a graph representing preferred ranges within defined parameters of film frame tempo groupings of right and left views employed in the projection of the recorded visual scenes and based on the relation of the distance of the nearest non-moving object in the scene from the recording cameras.

FIG. 3 is a graph illustrating the approximate film frame tempo, or number of film frames per group of alternating right and left views, to be projected on a viewing surface, based on the distance of the nearest non-moving object in the scene from the recording cameras. The ratios of the number of consecutive right and left film frames per group, as shown in the graph, are based on a conventional 24-frame per second projection rate of a standard movie projector. The graph shows the ratio of left view film frames per group to right view film frames per group which are projected in alternation on the 24-frame per second basis, which relates to a right/left duration rate within the aforesaid visiopsychological alternation rate between right and left views of the human visual apparatus, or from between about 1/24 to ¼ of a second.

Referring to the graph of FIG. 3, for example, if the approximate distance to the nearest non-moving object of special regard in the visual scene is about 2 feet or less, the left and right film frame groups may be composed of one to two frames each, for a visual duration of 1/24 to 1/12 second, projected in alternating sequence, on the viewing screen. If the nearest non-moving object of special regard in the scene is at a distance greater than 12', or infinity, the film frame groups of each left and right view of the scene may contain up to as much as about 5 to 6 frames each. The ranges of variation of the number of film frames in each group are indicated by the lengths of the arrows shown in the graph. As aforementioned, each of the left view frames and right view frames of the recorded scene are recorded with both horizontal lens base separation as well as vertical lens base separation therein.

When the process of the present invention is practiced by recording the visual scene simultaneously with two motion picture cameras to produce two motion picture film strips, a resultant single film strip product may be produced therefrom by editing and combining right and left view frame groups at the desired film frame tempo. In combining the two film strips, it is necessary that left and right view film frame be accurately aligned to superimpose and precisely project principal non-moving objects in the scene at the same points on the viewing surface. This may be accomplished in various ways known in conventional film editing. For example, the frame groups of the left and right view film strips may be alternately projected onto a suitable receiving surface for rephotographing or recording on a single film strip. Based on the distance to the nearest non-moving object in the scene, as illustrated in FIG. 3, a group of left view film frame (from 1 to 6, depending upon film frame tempo) would be projected onto and recorded from the surface. The last film frame of that group would then be simultaneously projected with the first film frame of the next sequential right view film frame group. These two simultaneously projected film frames would be accurately positioned to and exactly superimpose the nearest non-moving object of the scene in each frame. Thereafter, the left film frame view projector light would be cut off, and the right film frame view would be recorded on the resultant film strip.

Thereafter, the remaining film frames in the right film frame group (depending upon distance to the nearest non-moving object) would be projected and recorded. This projecting and recording sequence would be repeated, back and forth, simultaneously projecting the last film frame of one group with the first film frame of the next succeeding group to accurately superimpose the nearest non-moving objects in the scene.

Other editing techniques well known in the art could also be employed to produce a resultant single film strip recording for three-dimensional viewing of the scene.

The foregoing explanations of lens base separation in two directions perpendicular to each other, e.g., vertical and horizontal directions, film frame tempo between left and right projected views, and focus desparity between left and right views, all based on distance to the nearest non-moving object in the scene, apply to all situations where recording cameras are fixed, or non-moving, relative to the scene being recorded. In certain situations where the recording cameras are moved relative to the scene, as by panning the cameras or recording from cameras mounted on a moving vehicle, certain three dimensional effects may be observed in a single left or right recorded sequence of views of the scene, depending upon the speed of movement of the camera relative to the film frame recording speed, i.e., the cameras may move through a vertical or horizontal lens base distance which is timed to film frame speed in such a way as to produce the aforementioned visiopsychological alternation rate which results in stereopsis, or depth, being observed in a single film strip view. In such cases, editing of the film strip may be modified to produce the result of film frame tempo desired. In any event, the number of right and left film frames per group can be accurately determined in moving camera situations during the film editing and single film strip reproducing operations of the process.

From the foregoing description of the invention it can be appreciated that by utilizing both horizontal and vertical lens base separation of the two recording cameras at distances always maintained at less than about one inch, together with control of film frame tempo and focus disparity, two views of a scene can be superimposed in a state of central exactness by utilizing the nearest non-moving object in the scene, thereby eliminating keystoning, providing non-shake reproduction, and improving three dimensional viewing of a scene by the unaided human eye.

That which is claimed is:

1. An improved process for reproducing a visual scene which may be viewed in stereopsis by the unaided human eye comprising the steps of:

(a) recording a plurality of right and left views of a common visual scene from corresponding recording positions displaced from each other in a first direction at a distance of no more than about one inch and displaced from each other in a second direction generally perpendicular to said first direction at a distance of no more than about one inch, and (b) continuously projecting, in alternation, a sequential group of one or more of said right recorded views and a sequential group of one or more of said left recorded views onto a receiving surface for viewing by the human eye, said duration of projection of said alternating groups being such that the visual duration of each group on said surface varies from a minimum to a maximum duration which is generally correspondingly proportional to the distance of the nearest non-moving object of special regard in the scene from said recording positions, and wherein said duration is approximately equal to the visiopsychological alternation rate between right and left views of the human visual apparatus.

2. A process as defined in claim 1 wherein the distance of displacement of said recording positions in said first direction is substantially equal to the distance of displacement of said recording positions in said second direction.

3. A process as defined in claim 1 wherein said displacement distances are around $\frac{7}{8}$ inch when said nearest non-moving object is at a distance greater than about 12 feet from said recording positions.

4. A process as defined in claim 1 wherein said displacement distances of said recording positions are around $\frac{3}{4}$ inch when said nearest non-moving object in the scene is about 12 feet from said recording positions.

5. A process as defined in claim 1 wherein said displacement distances are at around $\frac{1}{2}$ inch when said nearest non-moving object is about 6 feet from said recording positions.

6. A process as defined in claim 1 wherein said displacement distances are around $\frac{1}{4}$ inch when said nearest non-moving object is about 2 feet from said recording positions.

7. A process as defined in claim 1 wherein said duration of projection of each said groups of right and left views varies from between about 1/24 to $\frac{1}{4}$ second.

8. A process as defined in claim 7 wherein said duration of projection is from about 1/24 second to 1/12 second when said nearest non-moving object in the scene is about 2 feet from the recording positions.

9. A process as defined in claim 7 wherein said duration of projection is from about 1/12 to $\frac{1}{4}$ second when said nearest non-moving object in the scene is about 6 feet from the recording positions.

10. A process as defined in claim 7 wherein said duration of projection is from about 1/12 to 1/16 second when said nearest non-moving object in the scene is about 12 feet from the recording positions.

11. A process as defined in claim 1 wherein said right and left views are recorded by recording means in which the central point of focus of one of said views is located at a point from said recording means which is approximately two-thirds the distance between said recording means and the nearest non-moving object in the scene, and the central point of focus of the other of said views is located at a point from said recording means which is approximately one and one-third the distance between said recording means and said nearest non-moving object in the scene.

12. An improved process for reproducing a visual scene which may be viewed in steropsis by the unaided human eye comprising the steps of:
    (a) continuously recording right and left views of a common visual scene from corresponding recording positions located approximately the same distance from the common visual scene and displaced from each other in a generally horizontal direction at a distance of no more than about 1 inch, and displaced from each other in a generally vertical direction at a distance or no more than about 1 inch; while
    (b) maintaining the central point of focus of one of said recording position views at a point which is approximately two-thirds the distance from said one recording position view to the nearest non-moving object of special regard in the scenes, while maintaining the central point of focus of the other of said recording position views at a point which is approximately one and one-third the distance between said other recording position and said nearest non-moving object in the scene; and
    (c) continuously projecting said right and left recorded views, in alternation, onto a receiving surface for viewing by the human eye, said duration of projection of each of said alternating views varying from a minimum of about 1/24 second to a maximum of about ¼ second in duration and generally correspondingly in proportion to the distance of the nearest non-moving object of special regard in the scene from said recording positions.

13. A improved process as defined in claim 12 wherein said right and left views are recorded on motion picture film utilizing two cameras and two film strips, and wherein said film strips are continuously projected in alternation in accordance with step (c) of claim 12 while views are re-recorded on a single motion picture film strip to produce a film strip product which may be projected from a single conventional movie projector for visualization on a receiving surface in three dimension by the unaided human eye.

* * * * *